US005392894A

United States Patent [19]

Grapes et al.

[11] Patent Number: 5,392,894

[45] Date of Patent: Feb. 28, 1995

[54] TRANSPORT/STACKER MODULE FOR IMPROVING SORTING THROUGHOUT OF A MAIL PROCESSING SYSTEM

[75] Inventors: Thomas F. Grapes, Columbia, Md.; Charles M. Miller, Seven Valleys, Pa.

[73] Assignee: Westinghouse Electric Corp., Pittsburgh, Pa.

[21] Appl. No.: 205,868

[22] Filed: Mar. 3, 1994

Related U.S. Application Data

[63] Continuation-in-part of Ser. No. 742,753, Aug. 9, 1991, Pat. No. 5,293,983.

[51] Int. Cl.[6] .............................................. B65G 37/00

[52] U.S. Cl. .................................. 198/367; 198/483.1; 198/704; 209/900

[58] Field of Search ............ 198/358, 367, 704, 483.1; 209/900, 653, 546; 271/298, 300, 2, 184

[56] References Cited

U.S. PATENT DOCUMENTS 3,696,946 10/1972 Hunter et al. .................. 209/900 X
4,171,739 10/1979 Yamato .............................. 198/704
4,274,783 6/1981 Eineichner et al. ................ 414/134
4,892,179 1/1990 Lassiter, Jr. et al. ............... 198/365
4,963,251 10/1990 Böhm et al. ......................... 209/564
5,096,047 3/1992 Morikiyo et al. ................... 198/704

*Primary Examiner*—Cheryl L. Gastineau
*Attorney, Agent, or Firm*—Christopher O. Edwards

[57] ABSTRACT

In a mail sorting system, a transport/stacker module comprises a plurality of mailpiece carriers included in a conveyor moving in an endless serpentine path through a plurality of distributed sorting sites. Each carrier is provided with a door at each of the longitudinally carrier ends, which are opened to permit the raking of mailpieces from laterally arranged compartments of the carrier into underlying bins at the sorting sites by selectively actuating separate rakes of a rake mechanism stationed at each sorting site. The carrier doors are constructed to provide longitudinal extensions of the carrier floor, thereby minimizing the spacing between the carriers in the conveyor while preserving a requisite interior longitudinal dimension of the carrier when the doors are closed.

20 Claims, 8 Drawing Sheets

TRANSPORT/STACKER MODULE FOR IMPROVING SORTING THROUGHOUT OF A MAIL PROCESSING SYSTEM

REFERENCE TO RELATED APPLICATION

This application is a continuation-in-part application of commonly-assigned, application of Thomas F. Grapes et al., entitled "TRANSPORT/STACKER MODULE FOR MAIL PROCESSING SYSTEM", Ser. No. 07/742,753, filed Aug. 9, 1991, U.S. Pat. No. 5,293,983, the disclosure of which is incorporated herein by reference.

BACKGROUND OF THE INVENTION

1. Field of the Invention

The present invention relates generally to mail processing systems and equipment and, more specifically to a transport/stacker module for a flat mailpiece sorting system.

2. Description of the Related Art

A typical automated mail processing system includes a mail induction system and a transport system, the mail induction system feeds mailpieces to the transport system which includes an endless loop conveyor consisting of a succession of mailpiece carriers. The induction system delivers a mailpiece to each of the carriers as they are conveyed along a conveyor path of oval or "racetrack" configuration. A plurality of sorting sites are distributed along the conveyor path. A sorting bin, positioned at each sorting site, is designated for a particular zip code, mailstop, address, etc. As the carriers move in succession past the sorting sites, separate rake mechanisms, respectively stationed thereat, are selectively actuated to rake mailpieces from the carriers into the appropriate bins positioned beneath the conveyor path. Mail transport systems of this conventional design require considerable floor space, are not readily expandable to increase the number of sorting sites, and are limited in sorting rate or throughput.

In the above-cited related application, a mail transport/stacker module, as disclosed therein, includes an endless loop conveyor for conveying a continuous succession of mail carriers in a serpentine conveyor path including a plurality of vertically spaced, horizontal conveyor runs. Sorting sites are distributed along the horizontal conveyor runs. Since the carriers move in alternating directions as they travel along successive horizontal conveyor runs, the carriers are equipped with doors at each end. As the conveyors move along a horizontal conveyor run in one direction, the trailing one of the doors of each carrier is in an open position, while the leading door of each carrier is in a closed position. A sorting rake at each sorting site is selectively actuated to rake a mailpiece from the carriers through their trailing, open ends into an underlying bin. The closed leading door acts as a wind screen to prevent relative wind from dislodging mailpieces from the carriers and also acts as a deflector to reliably direct a mailpiece, raked from an immediately preceding carrier, downwardly into an underlying bin. As each carrier transitions from one horizontal conveyor run to the next, its trailing door is closed. Then, as each carrier begins to move through this next horizontal conveyor run, the other, now trailing carrier door is opened to accommodate the raking of mailpieces from the carriers into the bins at the sorting sites distributed along this next horizontal conveyor run.

Sorting rate or throughput of mailpieces is directly related to conveyor speed and carrier pitch. Carrier pitch is determined by the length of the carriers, i.e., the carrier longitudinal dimension in the direction of conveyor motion, plus the length of the longitudinal gap between consecutive carriers. Carrier length must be somewhat larger than the maximum mailpiece size to be transported so that the mailpieces can lie flat on the carrier floor. The gap dimension between carrier must be sufficiently large, such that the longest and stiffest mailpieces that are to be sorted will be reliably directed downwardly into a sorting bin by the closed leading door of the immediately trailing carrier.

Maximum conveyor speed is determined by the forces on the mailpieces associated with motion, namely aerodynamic forces and inertial forces. Excessive conveyor speed leads to mailpieces being "blown off" the carriers and/or ejected from the carriers by centrifugal forces as they execute the 180° turnarounds to transition from one horizontal conveyor run to the next horizontal conveyor run of the serpentine conveyor path. The aerodynamic limiting speed is dependent on the characteristics of the mailpiece, e.g., large size, light weight mail pieces are blown off at a lower speed than small size, heavier pieces. The inertial limiting speed, on the other hand, is the speed at which mail pieces are ejected from the carriers in the 180° turns when the centrifugal force acting on the mailpieces exceeds their weight.

SUMMARY OF THE INVENTION

A primary objective of the present invention is to provide an improved transport/stacker module that is capable of increasing the sorting throughput of an automated mail sorting system.

A further objective of the present invention is to provide an improved mailpiece carrier for incorporation in a transport/stacker module included in an automated mail sorting system, wherein the carrier is structured to improve the sorting throughput of the automated mail sorting system.

These and other objectives of the present invention are met by providing a transport/stacker module that comprises an endless loop conveyor arranged in a serpentine conveyor path including a plurality of vertically spaced, horizontal conveyor runs. A plurality of carriers are attached to the conveyor at minimum intervals of constant pitch for conveyance past a plurality of sorting sites distributed along the horizontal conveyor runs. Each carrier includes a pair of laterally arranged, side-by-side compartments, each receiving mailpieces from a mail induction system. A rake mechanism, stationed at each sorting site, includes a pair of sorting rakes which are separately actuatable to selectively rake mailpieces from either one or both of the pair of compartments and into an underlying sorting bin or bins as the carriers pass through the sorting sites. By providing each carrier with a pair of mailpiece-receiving compartments from which the mailpieces can be selectively raked into appropriately sorting bins, the sorting throughput of the transport/stacker module of the present invention can be effectively doubled as compared to the transport/stacker module of the cited related application.

Sorting throughput is improved in accordance with another aspect of the present invention by providing a transport/stacker module that comprises an endless loop conveyor including a plurality of carriers spaced at minimum intervals of uniform pitch. Each carrier includes a floor, a pair of opposed, laterally spaced side walls in upstanding relation to the floor, and a pair of opposed, longitudinally spaced end members, with at least one of these end members hinged to the carrier for swinging motion between a closed position and an open position. This hinge mounted end member includes a pair of laterally extending sections. These lateral sections are relatively arranged such that, when the hinged end member is in its closed position, one of the laterally extending sections is oriented in upright relation to the carrier floor, while the other laterally extending section provides a longitudinal extension of the carrier floor.

When the hinged end member is in its open position, both of its laterally extending sections assume positions generally below the level of the carrier floor to expose a laterally extending edge of the carrier floor in increase longitudinally gapped relation with the immediately adjacent trailing carrier. By virtue of this increased gap, mailpieces raked off the carrier floor by actuation of a rake mechanism, stationed at each of a plurality of sorting sites distributed along the conveyor path, reliably fall between the carriers and into underlying sorting bins. Consequently, the pitch of the carrier positions along the conveyor can be reduced, thereby increasing mail sorting throughput.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof, as well as the attended drawings.

The accompanying drawings are included to provide a further understanding of the invention and are incorporated in and constitute a part of this specification, illustrate several embodiments of the invention and together with the description serve to explain the principles of the invention.

BRIEF DESCRIPTION OF THE DRAWINGS

Like reference numerals refer to corresponding parts throughout the several views of the drawings.

DETAILED DESCRIPTION OF THE PREFERRED EMBODIMENTS

Figure 1:
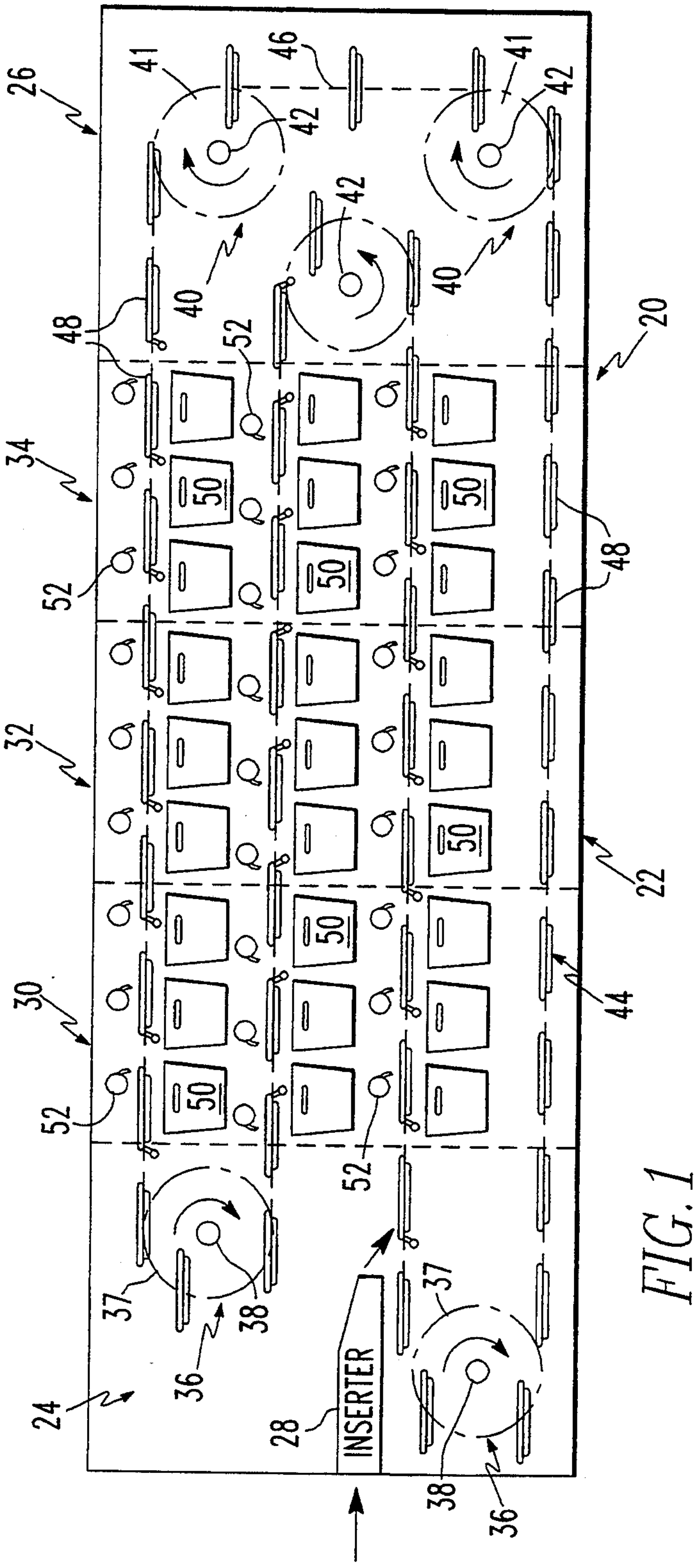
FIG. 1 is a side elevational view, partially in diagrammatic form, of a transport/stacker module constructed in accordance with the present invention.

The transport/stacker module of the present invention, generally indicated at 20 in FIG. 1, includes a large rectangular frame 22 for mounting the module components. The frame is preferably constructed in sections to facilitate expansion and contraction to suit individual mail handling needs of the customer. An interface section 24 is disposed at the front end of the frame, while a drive module 26 is disposed at the rear end. The interface section receives the inserter 28 of a mail induction system (not shown). The mail induction system delivers mailpieces to transport/stacker module 20 for conveyance past a plurality of sorting sites where the mailpieces are sorted into designated mail bins under the control of a system controller (not shown).

Sorting sections 30, 32 and 34 of the frame are disposed between the front interface section 24 and the rear drive section 26. The number of sorting sections can be increased or decreased, depending on the needs of the customer. For this purpose, the sorting sections are of a modular construction, such that they can be easily coupled together.

As described in detail in the above-cited application Ser. No. 07/742,753 and as generally illustrated in FIG. 1, the front interface section 24 of frame 22 supports vertically spaced sprocket pairs 36, each consisting of a sprocket 37 mounted at each end of a laterally extending, horizontal shaft 38. Rear frame section 26 similarly supports vertically spaced sprocket pairs 40, each consisting of a sprocket 41 mounted at each end of a laterally extending, horizontal shaft 42.

An endless loop conveyor, generally indicated at 44, includes a pair of chains 46 which are trained around the sprockets of the sprocket pairs 36 and 40 in a serpentine conveyor path configuration, as illustrated in FIG. 1. A plurality of carriers 48 are mounted between the chains 46 at regularly spaced intervals of uniform pitch by virtue of pivotal connections to laterally aligned links of the two chains, as disclosed in application Ser. No. 07/742,753.

Still referring to FIG. 1, a plurality of containers, such as bins 50, are stationed between horizontal runs of the conveyor 44 at a succession of sorting sites, so that the carriers pass over the open tops of the bins. Each sorting site may include a sensor (not shown) to detect when a bin is removed from a sorting site, or when a bin is full, so that the system controller can stop the sorting of mailpieces to that particular sorting site. Also, while sensors can detect when a bin or other type of container is full, the system controller can be programmed to determine a bin-full condition by tracking the number of mailpieces and accumulated thicknesses or weight of the mailpieces sorted out at each sorting site.

A rake mechanism, illustrated schematically at 52 in FIG. 1, is mounted by the frame 22 at each sorting site in a position above the bin thereat. The rake mechanisms are actuated upon receipt of a system controller signal when it is determined that a mailpiece in a particular carrier 48 is passing through the sorting site where the designated bin is stationed. The rake mechanism 52 deploys rake tines in positions to rake the mailpieces from the carriers into the designated bins as the carriers travel the horizontal conveyor runs through the sorting sites. Details of the rake mechanisms will be described below in conjunction with FIG. 5.

Figure 2:
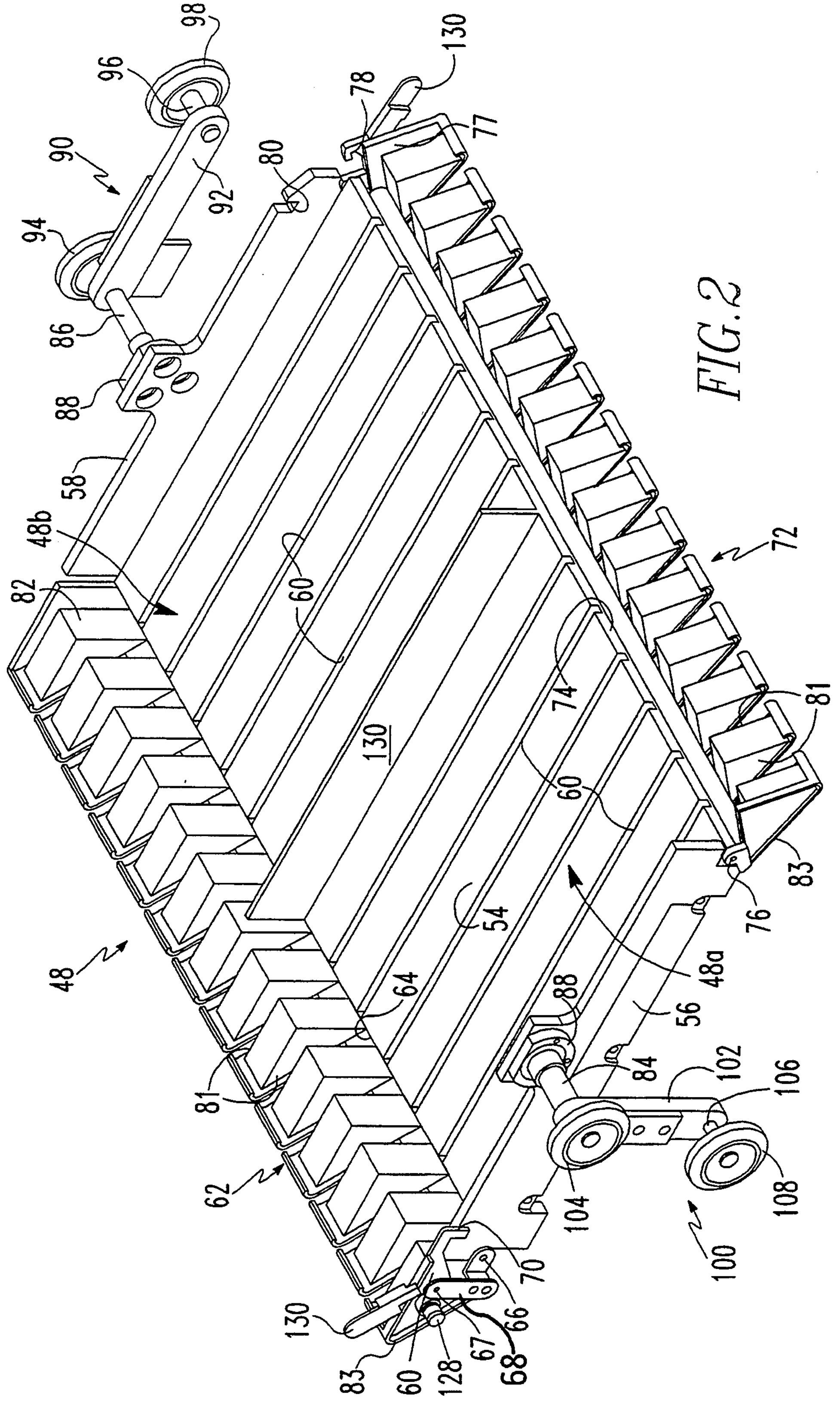
FIG. 2 is a perspective view of one of the mailpiece carriers utilized in the transport/stacker module of FIG. 1.

Referring now to FIG. 2, each carrier 48 includes a bottom plate or floor 54 to which opposed, laterally spaced sidewalls 56 and 58 are attached in upstanding relation by suitable fasteners, weldments, or the like. Alternatively, the floor and sidewalls can be formed as an integral structure. The upper surface of floor 54 is provided with a plurality of parallel, longitudinally extending (aligned with the horizontal conveyor runs) grooves 60 to ensure reliable raking of mailpieces from the carrier floor.

A first door 62 is pivotally mounted to floor 54 at a laterally extending longitudinal edge 64 of the floor by a hinge 66 for swinging movement between open and closed positions. A latch 68, pivotally mounted by hinge 67, holds door 62 in the closed position by engagement with a catch 70 formed in one end of sidewall 56. Other means for releasably retaining a door position can be used instead of a latch. For example, the door may be held in either the open or closed position by a spring and simply cammed or otherwise pushed into the other position by appropriate structures mounted by the frame 22. Also magnets may be used to hold the doors closed.

A second door 72 is pivotally mounted to floor 54 at the opposite laterally extending, longitudinal edge 74 by a hinge 76 for swinging movement between open and closed positions. A latch 80 is then pivotally mounted by hinge 77 to retain door 72 in its closed position by engagement with a catch 80 formed in one end of the sidewall 58. Each door is provided with a plurality of laterally spaced slots 81 which are aligned with grooves 60 in floor 54 to accommodate the rake tines in their raking function. Intermediate the slots, the doors in their closed positions present upright inner end surfaces 82 cooperating with the upright sidewalls 56, 58 to confine mailpieces on the carrier floor 54. Also, in their closed positions, the doors 62, 72 present downwardly and inwardly inclined surfaces 83 between slots 81, which are effective in directing mailpieces raked from immediately preceding carriers downwardly into underlying sorting bins.

A pair of outwardly extending, coaxially aligned shafts 84 and 86 are fixedly mounted by brackets 88 to sidewalls 56 and 58, respectively, at longitudinal medial points of the carrier. A horizontal stabilizer 90 includes a horizontally oriented arm 92 pinned at one end to shaft 86 and a roller 94 rotatably mounted on shaft 86 beyond arm 92. A laterally outwardly extending shaft 96 is pinned at its inner end to the free end of arm 92 and rotatably mounts at its outer end a roller 98 positioned outwardly beyond roller 94.

A vertical stabilizer 100 includes an arm 102 pinned in vertical orientation to shaft 84 and a roller 104 rotatably mounted on shaft 84 beyond the pinned upper end of arm 102. A laterally outwardly extending shaft 106 is pinned at its inner end to the free end of arm 102 and rotatably mounts a roller 108 at its outer end.

Figure 3:
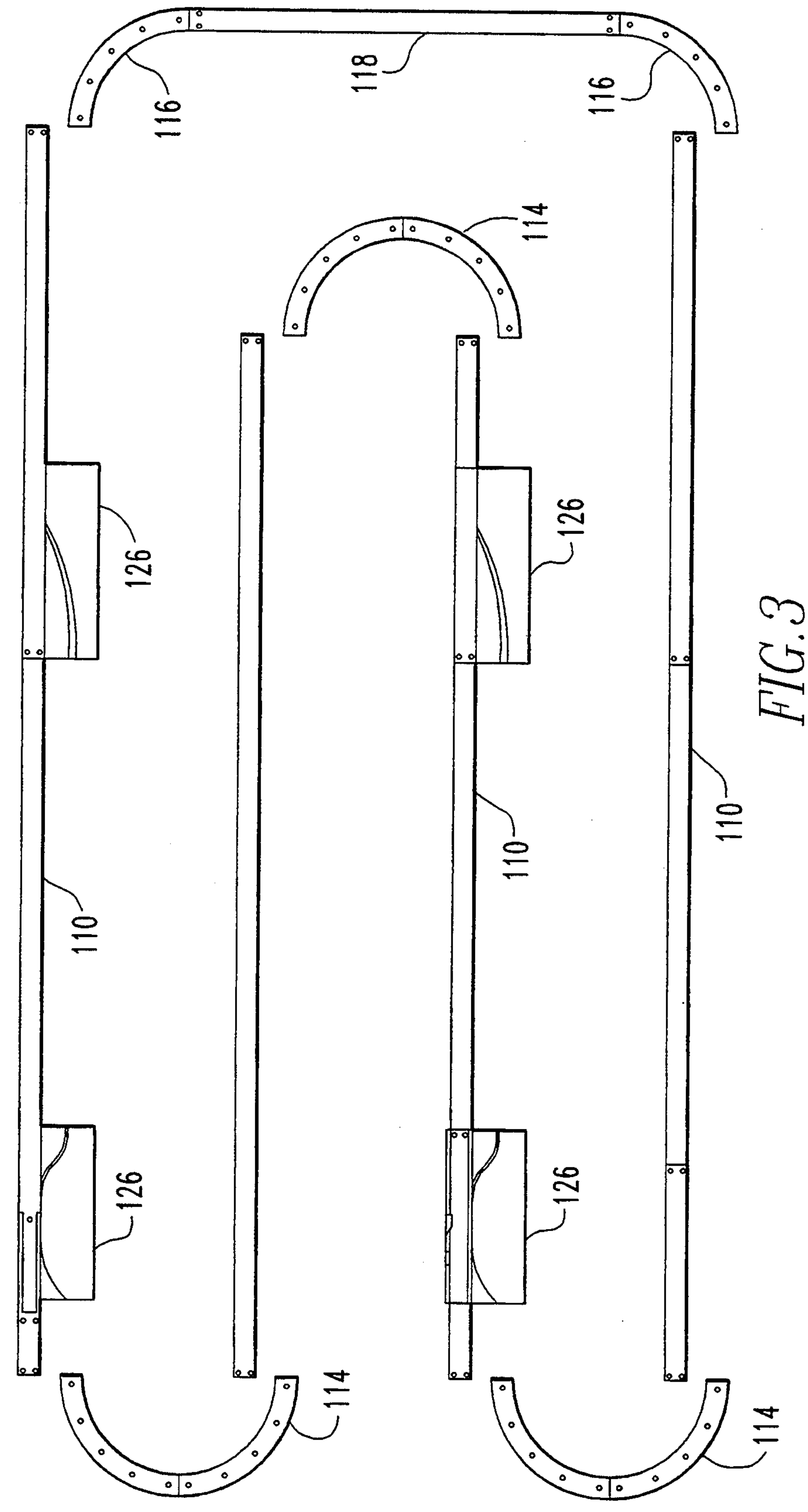
FIGS. 3 and 4 are side elevational views of a guide track system utilized in the transport/stacker module of FIG. 1.
Figure 4:
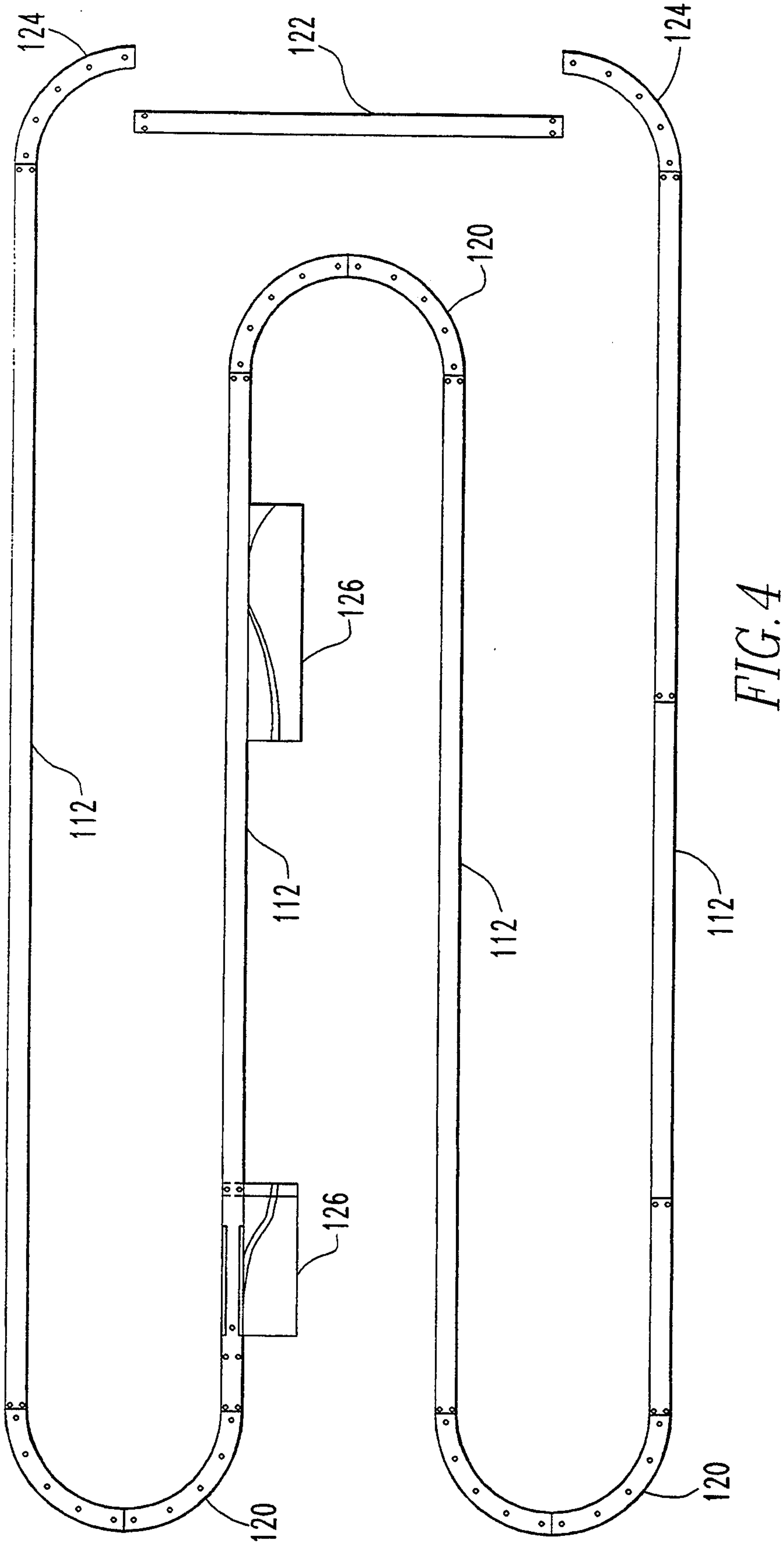

The rollers of the horizontal and vertical stabilizers run in a track system including track layouts, illustrated in FIGS. 3 and 4, which are mounted in opposed relation to the sides of the frame. Specifically, rollers 104 and 108 of vertical stabilizer 100 run in U-shaped tracks affixed to one side of frame 22 in the layout seen in FIG. 3, while rollers 94 and 98 of horizontal stabilizer 90 run in U-shaped tracks affixed to the other side of the frame in the layout seen of FIG. 4. The upper roller 104 of the vertical stabilizer runs in the horizontal track sections 110 of the track layout of FIG. 3, while both rollers 94 and 98 of the horizontal stabilizer run in the horizontal track sections 112 of the track layout seen in FIG. 4. Consequently, carriers 48 are maintained in horizontal orientations as they are conveyed through the horizontal runs of the serpentine conveyor path.

When the carriers reach the turnarounds in the serpentine conveyor path at each of the sprocket pairs, arcuate track sections are provided to guide carriers through these turnarounds while maintaining their horizontal dispositions. In FIG. 3, 180° arcuate track sections 114 are disposed in downwardly offset relation to the ends of the horizontal track sections 110 such that the lower roller 108 of the vertical stabilizer 100 enters the entry end of these arcuate track sections as the upper roller 104 leaves the exit end of an adjacent one of the horizontal track sections 110. As each carrier completes a turnaround, the lower roller 108 leaves the exit end of an arcuate track section as the upper roller 104 enters the entry end of an adjacent horizontal track section 110. To complete the endless serpentine conveyor path from the uppermost to the lowermost horizontal conveyor runs, the roller 108 of vertical stabilizer 100 runs in an elongated vertical track section 118 interconnecting a pair of 90° arcuate track sections 116 as seen in FIG. 3.

On the opposite side of the frame, both rollers 94 and 98 of horizontal stabilizer 90 run the horizontal track sections 112 to maintain the horizontal disposition of each carrier, as noted above. At the 180° turnarounds, only outer roller 98 of horizontal stabilizer 90 runs in 180° arcuate track sections 120 interconnecting the horizontal track section 112, as seen in FIG. 4, while inner roller 94 runs free. Thus, with roller 108 of the vertical stabilizer 100 running in an arcuate track section 114 (FIG. 3) while roller 98 runs in an arcuate track section 120 (FIG. 4), each carrier is maintained in a horizontal disposition during a 180° turnaround in the serpentine conveyor path.

During transition of the carriers from the uppermost to the lowermost horizontal conveyor runs to complete the endless serpentine conveyor path, the inner roller 94 of the horizontal stabilizer runs in an elongated vertical track section 122 extending in laterally offset relation to 90° arcuate track section extensions 124 of the uppermost and lowermost horizontal track sections 112 in which only outer roller 98 runs (FIG. 4). Concurrently, lower roller 108 of vertical stabilizer 106 runs in vertical track section 118 (FIG. 3), thereby maintaining the horizontal disposition of the carriers.

It is thus seen herein, and as also disclosed in the cited related application, that the track layouts seen in FIGS. 3 and 4 in combination with the horizontal and vertical stabilizers continuously maintain a horizontal disposition of the carriers throughout their conveyance along the serpentine conveyor path to ensure safe carriage of the mailpieces.

Also as disclosed in the cited related application, a plurality of cam plates 126 are mounted to the frame in positions at one side or the other of the carrier to engage either a cam follower 128 carried by each of the carrier doors 62, 72 or a latch actuating lever 130 for each of the door latches 60, 78 (FIG. 2). When a carrier 48 is traveling from right to left in the lowermost horizontal run seen in FIG. 1, both doors are latched closed, since there are no sorting sites or bins distributed along this run. Since this is the return run to the induction system inserter 28, the carriers will typically be empty of mailpieces. If a carrier is empty, it receives a mailpiece from inserter 28 with both doors closed and latched. Immediately thereafter, one of the cam plates 126 is positioned to engage in succession the latch lever 130 and cam follower 126 of the rear or trailing one of the doors, e.g., 62, during the passage of each successive carrier to begin a sorting run past the sorting sites distributed along the second level horizontal conveyor run of the serpentine conveyor path. That is, this initial cam plate 126 is position on the appropriate side of the frame (FIG. 3) such that it trips latch lever 130 to release latch 60 for door 62 and then the cam follower 128 for door 62 is engaged to force this door to its open position generally below the level of floor 54. The trailing edge of floor 54 is then exposed to accommodate the reliable raking of mailpieces from the carrier by a raking mechanism 52. While trailing door 62 is open, leading door 72 remains latched closed to act as a wind screen or air dam to prevent relative wind from blowing mailpieces out of the carriers.

As each carrier approaches the right end of the second level horizontal conveyor run, it is necessary to close the trailing door 62 prior to entering the turnaround leading to the third level horizontal conveyor run to reliably confine the mailpieces in the carriers as they execute the turnaround. Also, since the direction of carrier motion reverses in the third horizontal conveyor run, carrier door 62 then becomes the leading door and must remain closed to serve its wind screen function. Thus, another cam plate 126 is positioned on the same side of the frame (FIG. 3) to engage cam follower 128 and cam the trailing door 62 of each passing carrier to its closed, latched position prior to entering this turnaround.

After passing through this turnaround, door 72 of each carrier now becomes the trailing door in the third level horizontal conveyor run, and it must be unlatched and cammed open by a cam plate 126 positioned on the opposite side of the frame (FIG. 4). When the carriers approach the turnaround from the third to the fourth or uppermost horizontal conveyor run, a cam plate is positioned (FIG. 4) to cam the trailing door 72 of each passing carrier to its closed, latched position preparatory to executing this turnaround. After the carriers pass through this turnaround and start into the fourth level horizontal conveyor run, another cam plate 126 is positioned on the opposite side of the frame (FIG. 3) to unlatch and cam open the now trailing door 62 for the fourth level sorting run. Finally another cam plate is positioned on the same side (FIG. 3) at the end of this fourth level sorting run to close and latch door 62 of each carrier for the return run back to the induction system inserter 28.

In accordance with an important feature of the present invention, each carrier 48 is constructed to be twice the width, i.e., double the interior lateral dimension between sidewalls 56, 58, as compared to the carrier disclosed in the above-cited related application and therefore is provided with a longitudinally extending, upright partition 130 dividing the carrier 48 into two equally sized, mailpiece-receiving compartments indicated at 48*a* and 48*b* in FIG. 2. The induction system 28 then functions to deposit a mailpiece in each of these compartments. Consequently, for a given conveyor speed, the sorting throughput of the transport/stacker module of the present invention can be effectively twice the sorting throughput of the transport/stacker module disclosed in the cited related application. While two carrier compartments are disclosed, it will be appreciated that the carriers can be further laterally extended to accommodate additional side-by-side compartments, thus further increasing sorting throughput at the maximum permissible conveyor speed.

Figure 5:
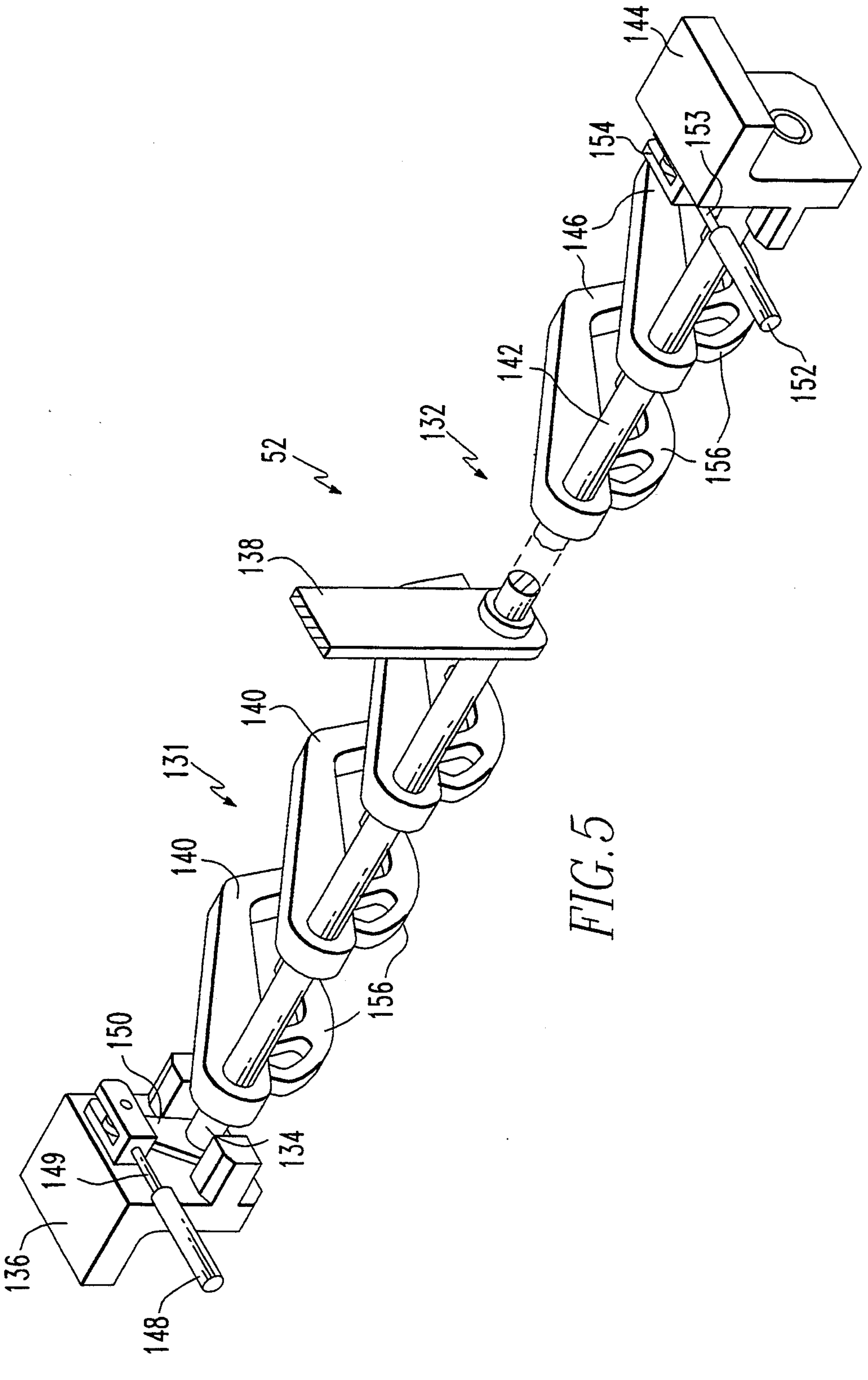
FIG. 5 is a fragmentary perspective view of a raking mechanism utilized in the transport/stacker module of FIG. 1.

To accommodate the sorting of mailpieces from the two compartments of each carrier, each rake mechanism schematically illustrated in FIG. 1 at 52 is constructed in the manner illustrated in FIG. 5 to include a pair of independently operating rakes, generally indicated at 131 and 132. Rake 131 is comprised of a shaft 134 rotatably mounted at its ends to the frame by an end support 136 and a center support 138. Shaft 134 fixedly mounts a plurality of rake tines 140 at intervals along its length. Rake 132 similarly comprises a shaft 142 rotatably mounted to the frame by an end support 144 and center support 138 in coaxial relation to, but independently of shaft 134 of rake 131. Shaft 142 also fixedly mounts a plurality of rake tines 146 at intervals along its length. Lateral positions of rake tines 140 and 146 are longitudinally aligned with grooves 60 in floor 54 and slots 81 in doors 62 and 72 of the carriers (FIG. 2).

A first air cylinder, pivotally mounted to the frame, includes a plunger 149 having its distal end pivotally connected to a crank 150 fixedly connected to shaft 134. Similarly, a second air cylinder 152, also pivotally connected to the frame, includes a plunger 153 having its distal end pivotally connected to a crank 154 fixedly connected to shaft 142.

It is thus seen that actuation of air cylinder 148 swings tines 140 of rake 131 between raised, non-raking positions and lowered, raking positions relative to one of the compartments 48*a* and 48*b* of each carrier 48 passing through the sorting sites along the horizontal conveyor runs. Air cylinder 152 swings tines 146 of rake 132 between corresponding non-raking and raking positions relative to the other of the two compartments of the passing carriers. Selective actuations of the air cylinders 148 and 152 are controlled by the system controller which tracks the mailpieces in each compartment of each carrier as they are transported along the serpentine conveyor path and then determines when to deploy the tines of rakes 131 and 132 into positions to rake mailpieces from the two compartments of each of the carriers. When the rakes are in their operative raking positions, the rake tines 140 and 146 pass through slots 81 in the closed leading door and their tips extend into the grooves 60 in the carrier floors to ensure that raking engagement is achieved with all mailpieces, regardless of their thickness.

As disclosed in the cited copending application Ser. No. 07/742,753, each rake tine 140 and 146 herein preferably includes a snubber 156 pivotally connected thereto. These snubbers are effective in controlling mailpieces as they are raked off the carrier floor, such that they are reliably deposited in the underlying bins in an orderly manner.

Figure 6:
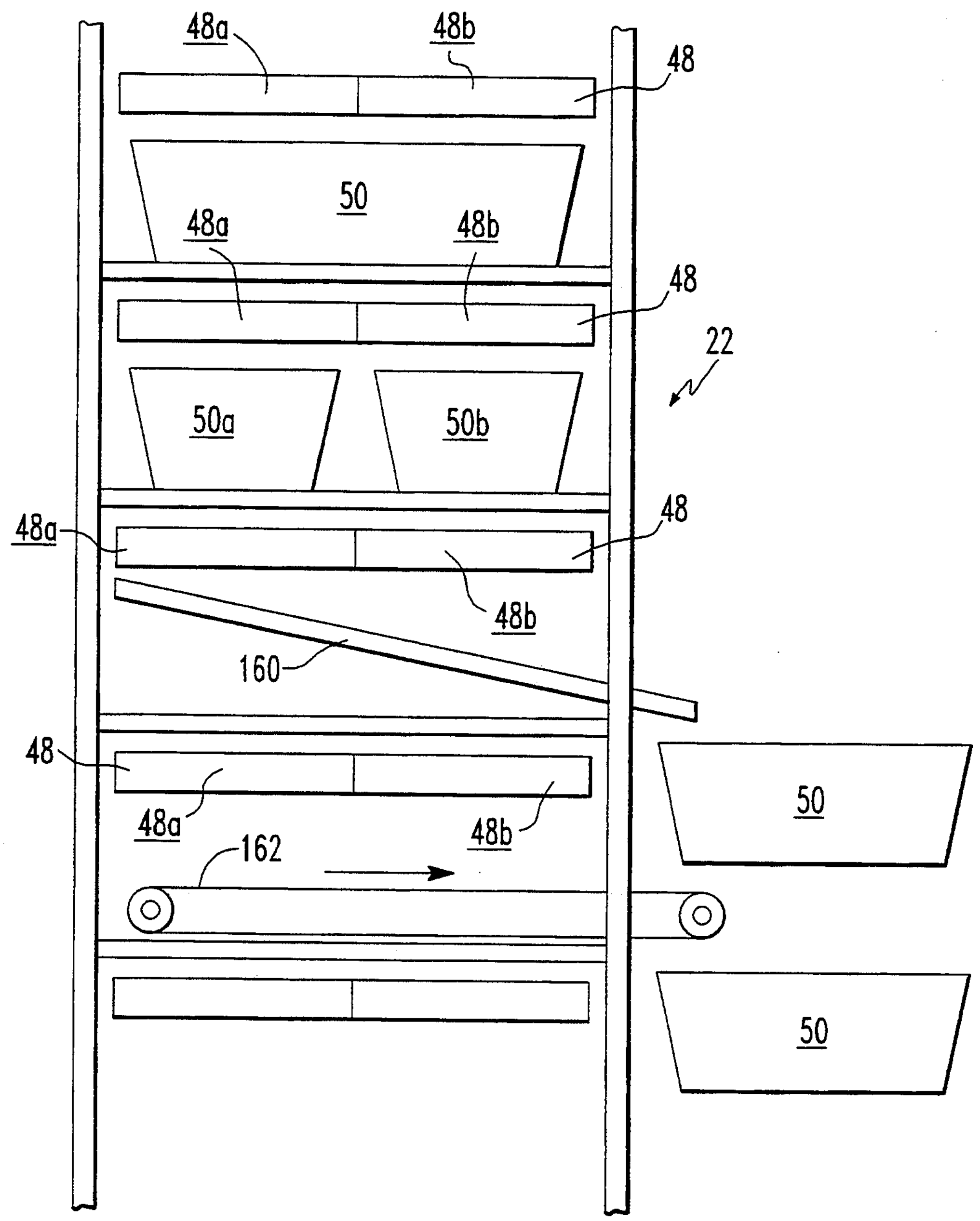
FIG. 6 is an end elevational view illustrating alternative arrangements of sorting bins utilized at sorting sites in the transport/stacker module of FIG. 1.

To accommodate sorting of mailpieces from the two compartments 48*a* and 48*b* of carriers 48, the sorting sites may be provided with a single bin, as indicated at 50 in FIG. 6. However, when sorting sites are designated for two different zip codes, mail drops, etc., two bins 50*a* and 50*b* would be provided to separate the mailpieces rake from carrier compartments 48*a* and 48*b*, respectively. Instead of placing bins directly beneath the horizontal conveyor runs through the sorting sites, mailpieces raked from the carriers may be directed into bins positioned to one side of the frame by an inclined chute 160 or by a belt conveyor 162. Positioning the bins to the side of frame 22 renders them more accessible for emptying.

Another approach to increasing sorting throughput is to reduce the spacing (carrier pitch) of the carriers 48 on conveyor 26. However, as pointed out above, there is a minimum gap dimension between carriers that must be observed to ensure that mailpieces raked from the carriers reliably fall through the inter-carrier gaps into the underlying sorting bins. Moreover, there is a minimum interior longitudinal dimension of the carrier that is dictated by the largest size mailpieces that the transport/stacker module is called upon to handle.

Figure 7:
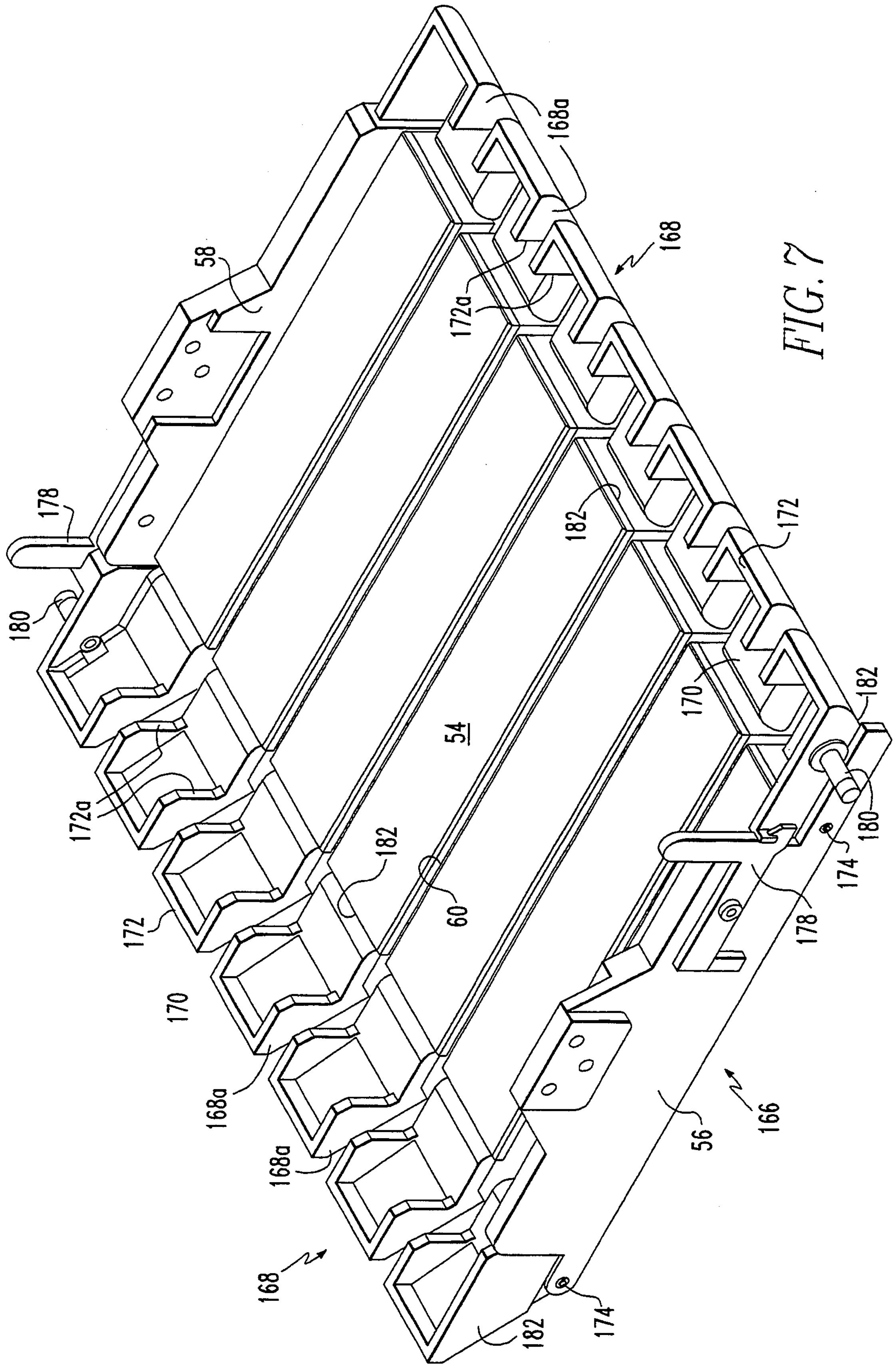
FIG. 7 is a perspective view of an alternative embodiment of a mailpiece carrier that can be utilized in the transport/stacker module of FIG. 1.

According to the embodiment of the invention seen in FIG. 7, a mailpiece carrier, generally indicated at 166, is provided to accommodate these dimensional constraints while permitting a reduction in carrier pitch. To achieve this goal, carrier 166 is provided with doors 168 at each longitudinal end, which are formed in two laterally extending sections 170 and 172. When the doors swing into their closed position on hinges 174, sections 170 lie in the same plane as carrier floor 54 and thus constitute longitudinal extensions of the carrier floor. Door sections 172 then assume positions in upright relation to the carrier floor so as to confine a mailpiece on the carrier and also to function as wind screens. Thus, the interior longitudinal dimension of carrier 166 taken between opposed vertical edges 172*a* of door sections 172 can be the same as the interior longitudinal dimension between opposed vertical surfaces 82 of closed doors 62 and 72 of carrier 48 (FIG. 2).

Doors 168 are equipped with latches 178 and cam followers 180 which are acted upon by the cam plates 126 stationed along the guide track layouts of FIGS. 3 and 4 to swing the doors between closed positions and open positions below the level of floor 54. With the doors in their open positions, laterally extending longitudinal edges 182 of the carrier floor are exposed to accommodate the raking of mailpieces off the carrier floor, as in carrier 48. The carrier floor of carrier 166 is grooved, as illustrated at 60 and doors 168 are slotted, as indicated at 168*a*, to accommodate the raking tines of the raking mechanism. The outer sides 182 of doors 166 are angled downwardly and inwardly to serve as deflectors when the doors are closed to direct mailpieces raked from preceding carriers downwardly into the sorting bins.

Figure 8:
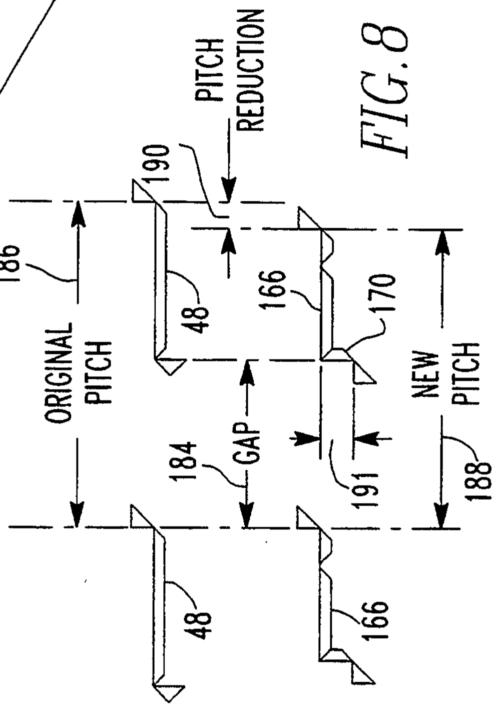
FIG. 8 is a diagram illustrating the pitch reduction feature achieved by the mailpiece carrier embodiment of FIG. 7.

FIG. 8 is illustrates diagrammatically how pitch reduction is achieved by the utilization of carriers 166 in conveyor 26. To preserve the requisite inter-carrier longitudinal gap 184, the minimum carrier pitch that can be achieved using carrier 48 is indicated at 186. By virtue of the unique door construction utilized in carriers 166, the same inter-carrier gap dimension 184 can be achieved by connecting carriers 166 into conveyor 44 (FIG. 1) at a new carrier pitch 188 to achieve a pitch reduction indicated at 190. It is seen that this pitch reduction is essentially equal to the longitudinal dimension, indicated at 191, of a door section 170.

Figure 9:
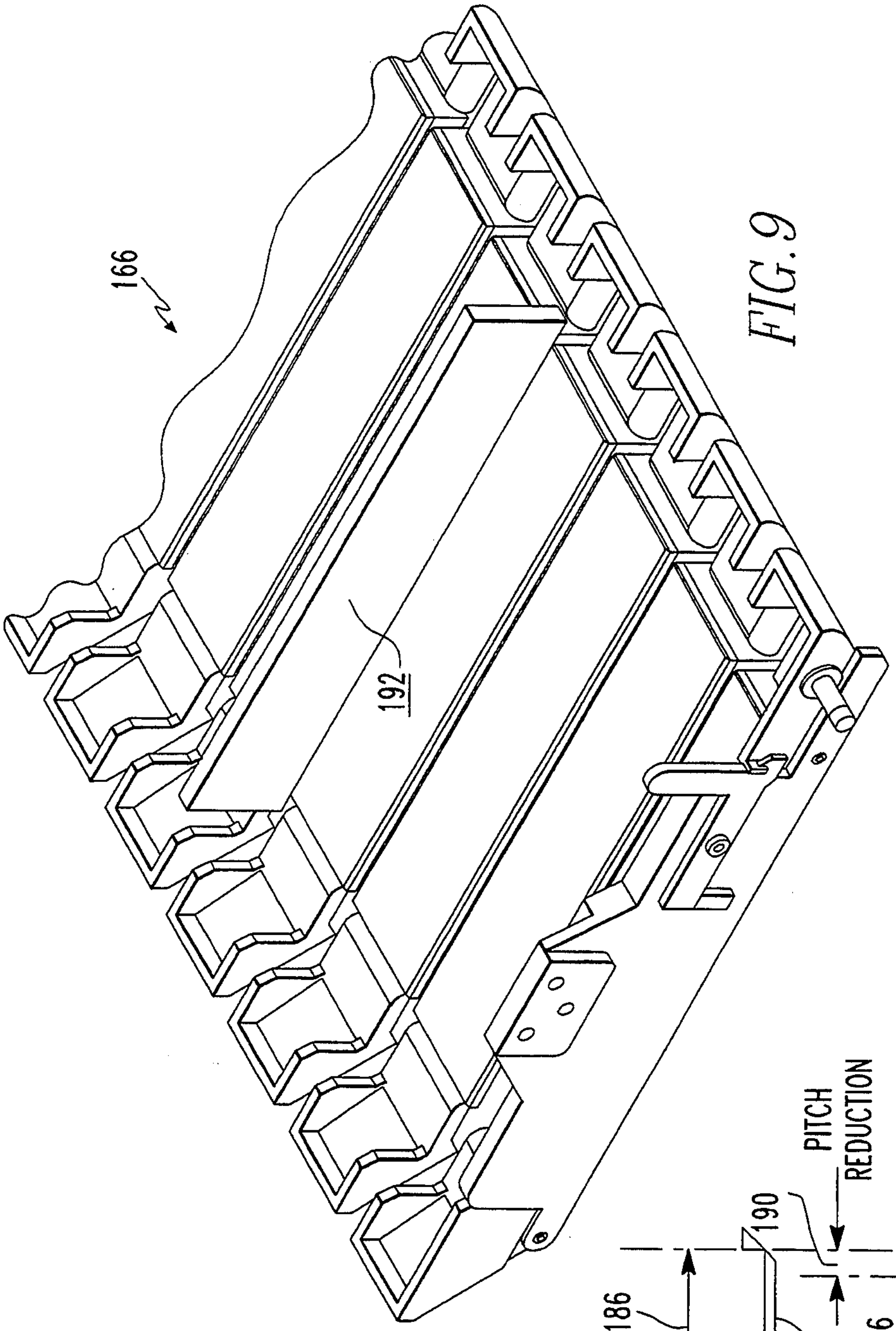
FIG. 9 is a fragmentary perspective view illustrating another mailpiece carrier embodiment that can be utilized in the transport/stacker module of FIG. 1.

As illustrated in FIG. 9, carriers 166 may be extended laterally to double the carrier width seen in FIG. 7 and then provided with a medial partition 192 to divide the carrier into two mailpiece-receiving compartments 166*a* and 166*b* in the same manner as carriers 48. As a result, using carriers 166 as illustrated in FIG. 9 in conveyor 26 achieves a further increase in sorting throughput as compared to carriers 48 by virtue of the reduction in carrier pitch.

It will be apparent to those skilled in the art that various modifications and variations can be made in the apparatus of the present invention without departing from the spirit or scope of he invention. Thus it is intended that the present invention cover the modifications and variations of this invention provided they come within the scope of the appended claims and their equivalents.

What is claimed is:

1. A transport/stacker module comprising:

a support frame;

an endless loop conveyor;

a plurality of wheeled members mounted by the frame and supporting the conveyor for driven movement along a serpentine conveyor path including a plurality of vertically spaced, substantially horizontal conveyor runs;

a plurality of carriers attached to the conveyor at spaced intervals, each carrier including a pair of compartments arranged transversely of the conveyor path in substantial side-by-side relation, each compartment for receiving a mailpiece from a mail induction system;

at least one bin positioned at each of a plurality of mail sorting sites distributed along at least some of the horizontal conveyor runs; and a rake mechanism located at each sorting site, each rake mechanism including a pair of separately actuatable sorting rakes for selectively raking a mailpiece from either or both of the pair of compartments of the carriers into the bins positioned beneath the horizontal conveyor runs as the carriers move through the sorting sites.

2. The transport/stacker module according to claim 1, which further includes guides, mounted by the frame in positions along the serpentine conveyor path, for controlling orientations of the carriers during movement along the serpentine conveyor path.

3. The transport/stacker module according to claim 2, wherein each carrier includes horizontal and vertical stabilizers engaged by the guides to maintain a substantially horizontal orientation of the carrier during movement along the serpentine conveyor path.

4. The transport/stacker module according to claim 1, wherein each carrier includes:

a floor;

a pair of opposed, laterally spaced sidewalls disposed in upstanding relation to the floor;

a pair of opposed, longitudinally spaced doors;

hinges mounting the doors for swinging movement between closed and open positions, in the closed positions the doors cooperating with the sidewalls in confining mailpieces lying on the floor, and in the open position, the doors being disposed in positions generally below the level of the floor to permit the raking of mailpieces off the floor and then to fall by gravity into the bins at the sorting sites; and a longitudinally extending, upright partition disposed between the sidewalls to divide the carrier into the pair of compartments.

5. The transport/stacker module according to claim 4, wherein each carrier includes separate door holding means for holding each of the pair of doors in their closed positions, the transport/stacker module further including door opening means positioned by the frame to act on the door holding means to cause a trailing one of the pair of doors to swing to the open position as the carriers enter each of the horizontal conveyor paths having distributed sorting sites.

6. The transport/stacker module according to claim 5, which further includes door closing means positioned by the frame for swinging the trailing one of the pair of doors to the closing position as the carriers leave each of the horizontal conveyor paths having distributed sorting sites.

7. The transport/stacker module according to claim 4, wherein each door includes at least first and second laterally extending sections, in the closed door position, the first section being oriented in upstanding relation with the floor and the second section being oriented as a longitudinal extension of the floor, and, in the door open position, the first and second door sections being disposed in positions generally below the level of the floor to expose a laterally extending floor edge, whereby to increase a longitudinal gap between the exposed floor edge and an immediately adjacent carrier through which a mailpiece raked from the floor falls by gravity into underlying bins positioned at the sorting sites.

8. The transport/stacker module according to claim 7, wherein the floor of each said carrier is provided with a plurality of laterally spaced grooves, each said second door section is provided with grooves positioned in longitudinal alignment with the floor grooves, and each said first door section is provided with slots longitudinally aligned with the floor grooves and the second section grooves, whereby to accommodate tines of the sorting rakes operating to rake mailpieces off of the carrier floors.

9. The transport/stacker module according to claim 1, wherein a pair of bins are located at each sorting site in positions to respectively receive mailpieces raked from the pair of compartments of the carriers.

10. The transport/stacker module according to claim 1, which further includes a chute located at each sorting site, on which mailpieces raked from the pair of compartments slide into a single bin.

11. The transport/stacker module according to claim 1, which further includes a belt conveyor located at each sorting site for conveying mailpieces raked from the pair of compartments into a single bin.

12. A transport/stacker module comprising:

a support frame;

an endless loop conveyor;

a plurality of wheeled members mounted by the frame and supporting the conveyor for driven movement past a plurality of sorting sites distributed along at least one horizontal conveyor run;

a plurality of carriers attached to the conveyor at spaced intervals, each carrier including:

a floor;

a pair of opposed, laterally spaced sidewalls in upstanding relation with the floor, a pair of opposed, longitudinally spaced end members cooperating with the upstanding sidewalls to confine a mailpiece lying on the floor, at least one of the end members having first and second laterally extending sections, a hinge mounting the one end member for swinging movement between open and closed positions, in the closed position, the first section being oriented in upstanding relation to the floor and the second section being oriented as a longitudinal extension of the floor, and, in the open position, the first and second sections assuming positions generally below the floor to expose a laterally extending, trailing edge of the floor, whereby to increase a longitudinal gap between the exposed floor edge and an immediately adjacent one of the carriers;

at least one bin located at each sorting site; and a rake mechanism located at each sorting site, each rake mechanism including a sorting rake selectively actuated to rake a mailpiece off the floor and over the exposed floor edge to fall by gravity through the longitudinal gap and into an underlying one of the bins.

13. The transport/stacker module according to claim 12, wherein the wheeled members support the conveyor for driven movement along a serpentine path including a plurality of vertically spaced, horizontal conveyor runs, and wherein the other end member of the pair of end members has third and fourth laterally extending sections, and the transport/stacker module further includes an additional hinge mounting the other end member for swinging movement between open and closed positions, in the closed positions, the third section being oriented in upstanding relation to the floor and the fourth being oriented as a second horizontal extension of the floor, and in the open position, the third and fourth sections being located in positions generally below the floor to expose a second laterally extending, trailing edge of the floor, whereby to increase a longitudinal gap between the second exposed floor edge and an immediately adjacent one of the carriers.

14. The transport/stacker module according to claim 13, wherein each carrier further includes latches for releasably retaining the pair of end members in their respective closed position.

15. The transport/stacker module according to claim 14, wherein the floor is provided with a plurality of laterally spaced, longitudinally extending grooves, the second and fourth end member sections are provided with grooves positioned as longitudinal extensions of the floor grooves, and the first and third end member sections are provided with slots longitudinally aligned with the floor grooves and the second and fourth section grooves, whereby to accommodate tines of a rake mechanism operating to rake mailpieces off of the carrier floor.

16. The transport/stacker module according to claim 13, wherein each carrier further includes a longitudinally extending, upright partition disposed between the sidewalls to divide the carrier into a pair of compartments, each compartment accommodating a mailpiece, and the rake mechanism further includes a pair of separately actuatable sorting rakes for selectively raking a mailpiece from either or both of the pair of compartments of each carrier into the bins positioned beneath the horizontal conveyor runs as the carriers move through the sorting sites.

17. A carrier for a mail sorting system having a conveyor for conveying a plurality of the carriers in closely spaced, serial relation along a conveyor path, said carrier comprising:

a floor;

a pair of opposed, laterally spaced sidewalls in upstanding relation with the floor;

a pair of opposed, longitudinally spaced end members cooperating with the upstanding sidewalls to confine a mailpiece lying on the floor, at least one of the end members having first and second laterally extending sections; and a hinge mounting the one end member for swinging movement between open and closed positions, in the closed position, the first section being oriented in upstanding relation to the floor and the second section being oriented as a longitudinal extension of the floor, and, in the open position, the first and second sections being disposed in positions generally below the floor to expose a laterally extending edge of the floor, whereby to increase a longitudinal gap between the exposed floor edge and an adjacent carrier as the mailpiece is sorted from the carrier by being raked off the floor and over the exposed floor edge to fall by gravity through the gap between the exposed floor edge and the adjacent carrier.

18. The carrier according to claim 17, wherein the other end member of the pair of end members includes third and fourth laterally extending sections, and the carrier further includes an additional hinge mounting the other end member for swinging movement between open and closed positions, in the closed position, the third section being oriented in upstanding relation to the floor and the fourth section being oriented as a second longitudinal extension of the floor, and, in the open position, the third and fourth sections being disposed in positions generally below the floor.

19. The carrier according to claim 18, which further includes latches for releasably retaining the pair of end members in their respective closed positions.

20. The carrier according to claim 19, wherein the floor is provided with a plurality of laterally spaced, longitudinally extending grooves, the second and fourth end member sections are provided with grooves positioned as longitudinal extensions of the floor grooves, and the first and third end member sections are provided with slots longitudinally aligned with the floor grooves and the second and fourth section grooves, whereby to accommodate tines of a rake mechanism operating to rake mailpieces off of the carrier floor.

* * * * *